US007143983B2

(12) United States Patent
McClure

(10) Patent No.: US 7,143,983 B2
(45) Date of Patent: Dec. 5, 2006

(54) PASSIVE JET SPOILER FOR YAW CONTROL OF AN AIRCRAFT

(75) Inventor: Paul D. McClure, Ft. Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 457 days.

(21) Appl. No.: 10/229,971

(22) Filed: Aug. 28, 2002

(65) Prior Publication Data
US 2004/0089764 A1 May 13, 2004

(51) Int. Cl.
B64C 21/02 (2006.01)

(52) U.S. Cl. ............. 244/204; 244/207; 244/208; 244/90 A

(58) Field of Classification Search ........... 244/204, 244/207, 208, 209, 198, 201, 90 R, 90 A
See application file for complete search history.

(56) References Cited

U.S. PATENT DOCUMENTS

| | | | | |
|---|---|---|---|---|
| 2,077,071 A | * | 4/1937 | Rose ................... | 244/204 |
| 2,431,449 A | * | 11/1947 | Ashkenas et al. ........ | 244/87 |
| 2,507,611 A | * | 5/1950 | Pappas et al. ........... | 244/198 |
| 2,597,769 A | * | 5/1952 | Ashkenas ............... | 244/226 |
| 3,142,457 A | * | 7/1964 | Quenzler ................ | 244/203 |
| 3,262,658 A | * | 7/1966 | Reilly .................. | 244/207 |
| 3,298,636 A | * | 1/1967 | Arnholdt ............... | 244/198 |
| 3,586,267 A | * | 6/1971 | Ingelman-Sundberg ..... | 244/203 |
| 3,854,678 A | * | 12/1974 | Geres .................. | 244/3.16 |
| 3,977,629 A | * | 8/1976 | Tubeuf ................. | 244/3.22 |
| 4,392,621 A | * | 7/1983 | Viets ................... | 244/12.5 |
| 4,504,192 A | | 3/1985 | Cyrus et al. ............ | 416/41 |
| 5,901,929 A | | 5/1999 | Banks et al. ............ | 244/207 |
| 6,286,892 B1 | | 9/2001 | Bauer et al. ............ | 296/180.4 |
| 6,464,171 B1 | * | 10/2002 | Ruffin .................. | 244/130 |

OTHER PUBLICATIONS

"The Jet Spoiler as a Yaw Control Device"; Tavella et al., Joint Institute for Aeronautics and Acoustics Dept. of Aeronautics and Astronautics, 1994, pp. 243-249.
Alternative Methods of Roll Control for the Wide-Area Surveillance Projectile, Jadon Smith, Dec. 11, 2001—REPORT.

* cited by examiner

Primary Examiner—Galen Barefoot
(74) Attorney, Agent, or Firm—Bracewell & Giuliani LLP

(57) ABSTRACT

A wing for an aircraft has a passive jet spoiler for providing yaw control by increasing drag on the wing. The spoiler comprises an inlet located near the leading edge of a lower surface of the wing and at least one outlet formed on the lower surface or on an upper surface of the wing. An internal passage connects the inlet and each outlet for allowing air to pass from the inlet to the outlet. The air exits the outlets generally normal to the respective surface of the wing, causing a laminar flow to separate from the surfaces downstream of each outlet. The separated flow increases the drag on the wing, producing a yawing moment on the aircraft. Selective placement of the outlets on the upper and lower surfaces limits undesirable roll and pitch moments. Valves are provided for selectively controlling the amount of air passing through the spoiler.

17 Claims, 4 Drawing Sheets

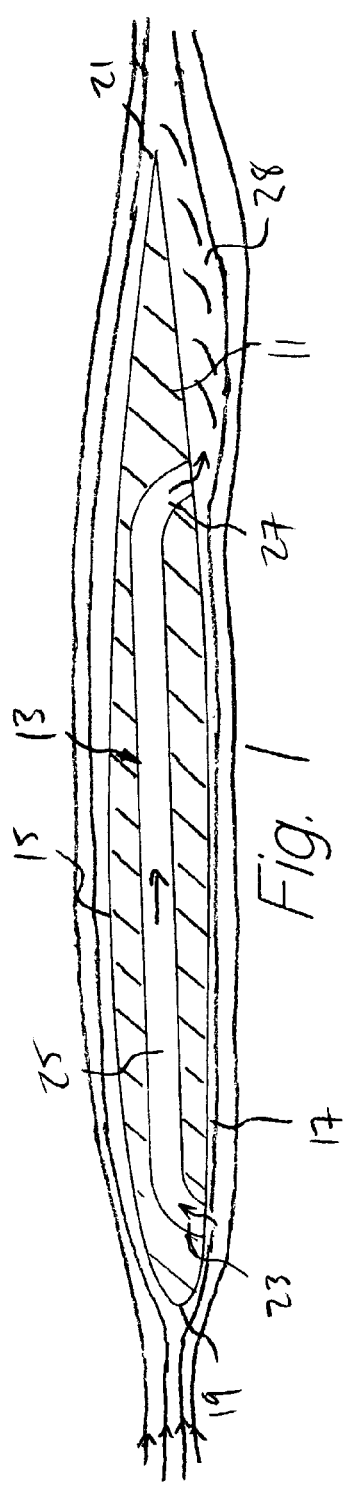
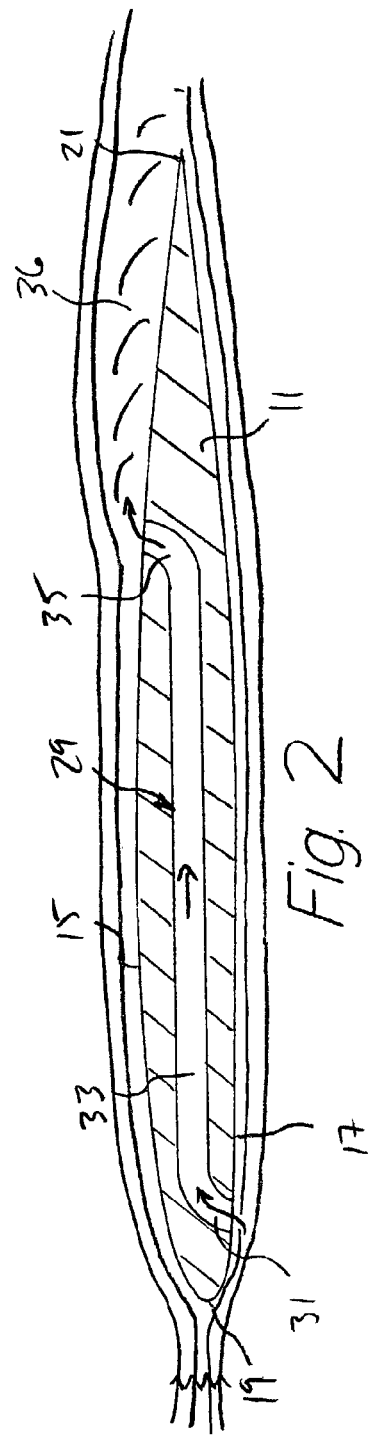
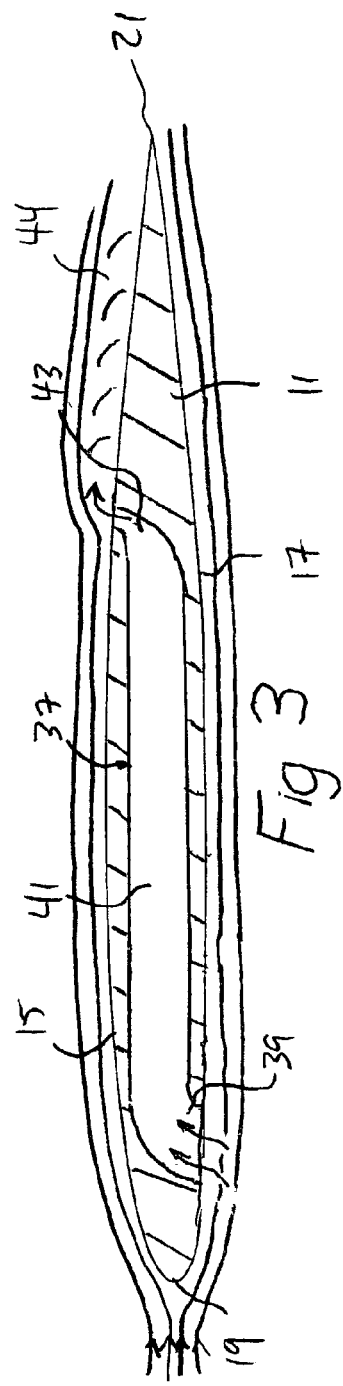

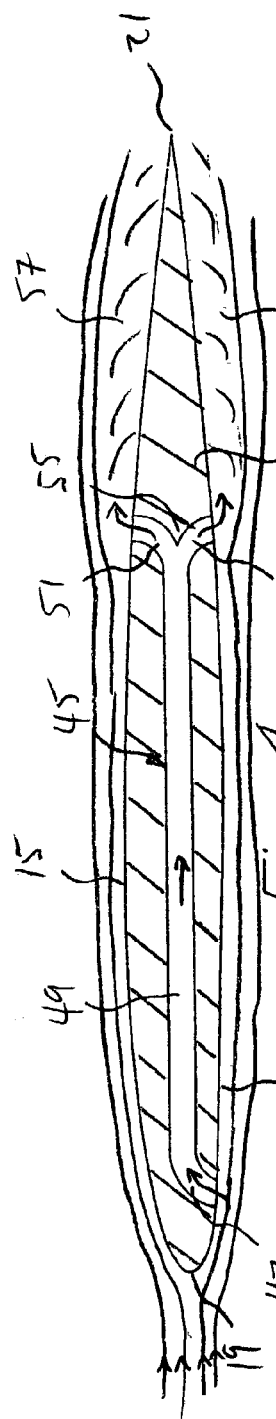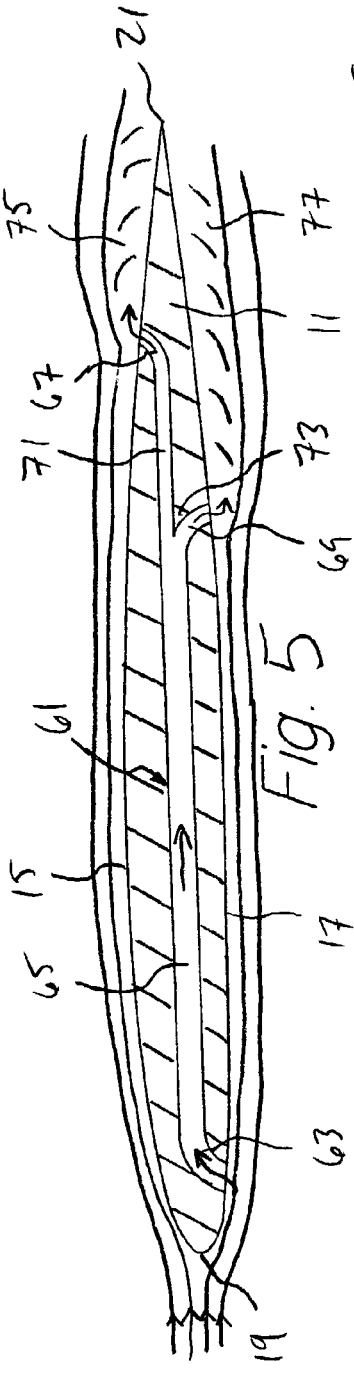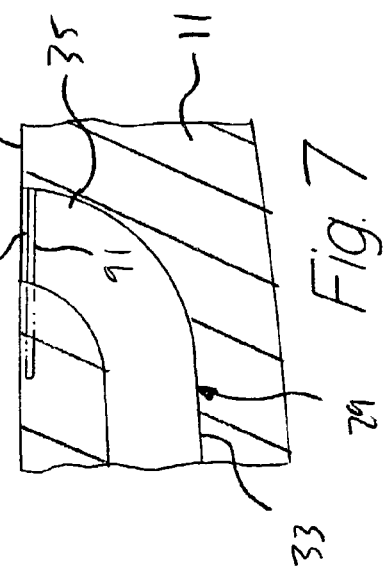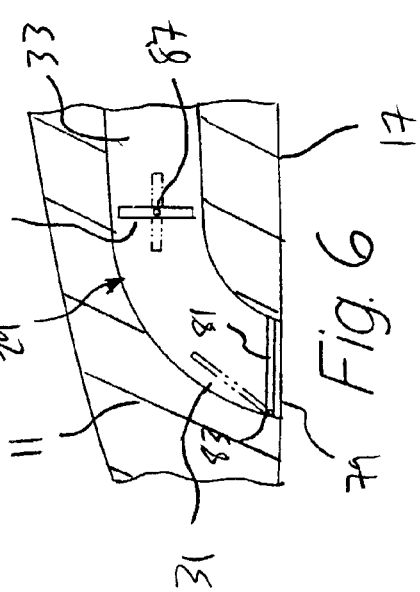

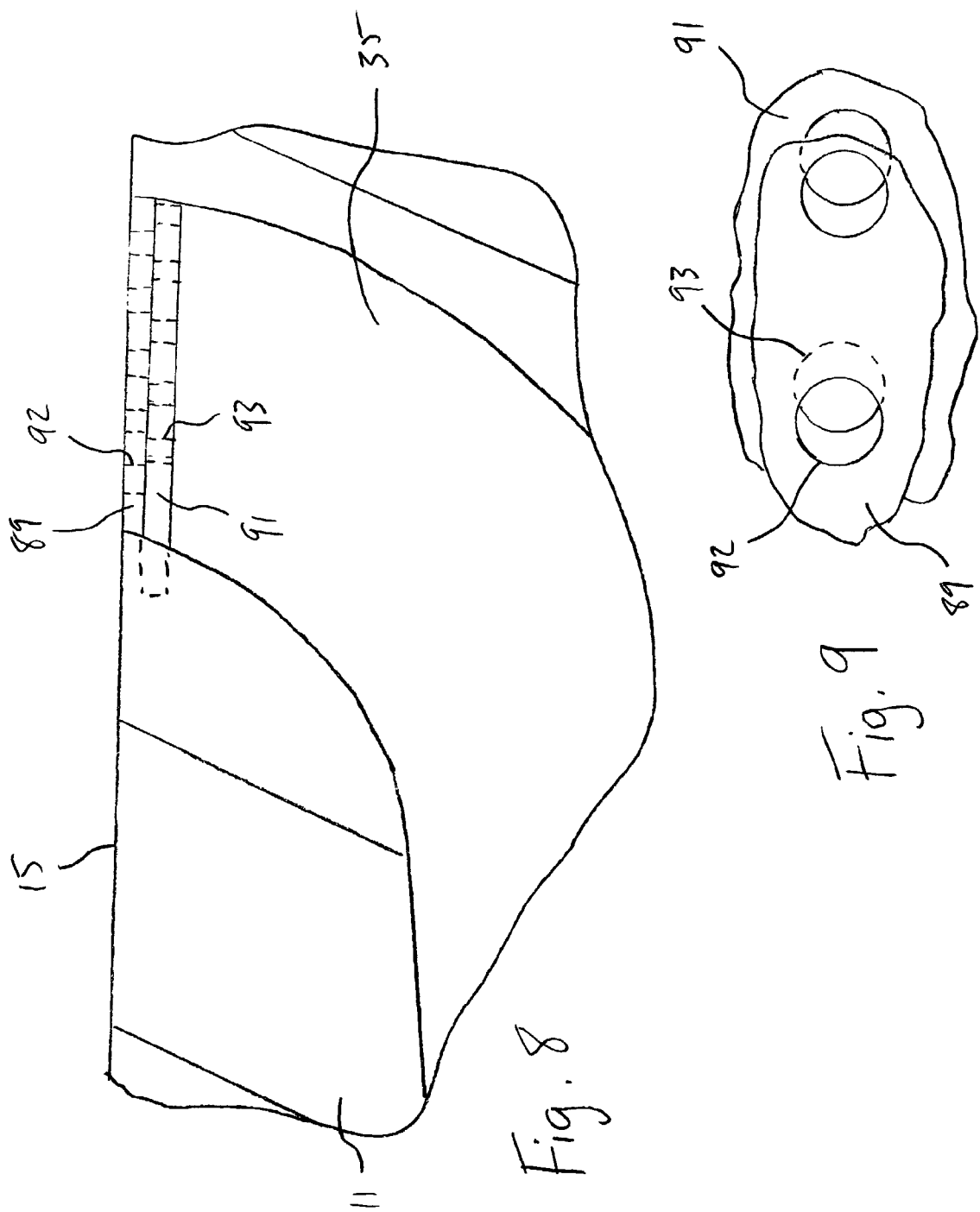

US 7,143,983 B2

PASSIVE JET SPOILER FOR YAW CONTROL OF AN AIRCRAFT

BACKGROUND OF THE INVENTION

1. Field of the Invention

The present invention relates generally to aerodynamic flight control of aircraft and relates specifically to passive jet spoilers used to create yaw moments.

2. Description of the Related Art

Wings for aircraft are constructed to have a longitudinal profile that produces lift as air flows across the upper and lower surfaces of the wing. The air flows with a greater velocity over the upper surface, producing a low-pressure area, and the high pressure below the wing pushes the wing upward. Ideally, the air flows across the wing in an attached, laminar stream adjacent a low velocity boundary layer, minimizing inherent drag and maximizing lift of the wing for a given airspeed. When the boundary layer becomes separated, or detached, from a portion of the wing, the flow becomes turbulent, and the wing is said to "stall" in that area. This increases drag and reduces lift.

It is known in the art that this separation can be caused by various means, including solid and jet spoilers. A solid spoiler is typically an articulating element that is moved from a streamlined position into a position in the airflow that causes the separation. A jet spoiler produces the separation by injecting pressurized air through holes or slots in the wing for separating the boundary layer. One advantage of jet spoilers over solid spoilers is the reduced radar signature, since no solid elements are moved into the airflow. Prior-art jet spoilers have typically included a source of pressurized air provided by the engines or other source carried on the aircraft, and this type of spoiler is referred to herein as an "active" spoiler.

Jet spoilers were studied in the past for producing roll moments, particularly for missiles, though yaw moments were considered undesirable. However, as described in "The Jet Spoiler as Yaw Control Device," AIAA 86-1806, D. A. Tavella, et al., conducted experimentation using active jet spoilers for aircraft wings to produce yaw moments. This research built on a concept for a "passive" jet spoiler disclosed in U.S. Pat. No. 4,504,192 to Cyrus, et al., for controlling the power output of a wind-powered Darrieus turbine. The blades of the turbine are hollow, and air within the blades is accelerated outward as the turbine rotates. By providing an inlet at an inner end of the blades and holes on the inner and outer surfaces of the blades, air is drawn into the inlets and blows out of the outlets. This air disrupts the airflow across the surfaces of the blades, producing drag on the blades for limiting the speed of rotation or for use in an emergency shutdown.

The tests by Tavella, et al., used a slot in a test wing to inject high-velocity, pressurized air into the boundary layer on the upper surface only or at opposing positions on the upper and lower surfaces, the positions being located approximately the same distance from the leading edge of the wing. While effective for producing yaw moments, a significant roll moment was also produced.

There is a need for a passive jet spoiler for yaw control of aircraft, with the spoiler having a maximized yaw moment and a minimized roll and pitch moments. Also, there is a need for a passive jet spoiler that uses the air flowing on the underside of the wing for providing the air to the outlets for separating the airflows. Additionally, there is a need for a passive spoiler having valves for controlling the amount of air passing through the spoiler and/or the relative amounts of air flowing out of multiple outlets.

BRIEF SUMMARY OF THE INVENTION

A wing for an aircraft has a passive jet spoiler for providing yaw control by increasing drag on the wing. The spoiler comprises an inlet located near the leading edge of a lower surface of the wing and at least one outlet formed on the lower surface and/or on an upper surface of the wing. An internal passage connects the inlet and each outlet for allowing air to pass from the inlet to the outlets. Air passing across the lower surface enters the inlet and passes to the outlets. The air exits the outlets generally normal to the respective surface of the wing, causing an attached flow to separate from the surface downstream of each outlet. The separated flow increases the drag on the wing, producing a yawing moment on the aircraft. Selective placement of the outlets on the upper and lower surfaces limits undesirable roll and pitch moments. Valves are provided for selectively controlling the amount of air entering the inlet, passing through the internal passage, and/or exiting the outlets. The valves may also be used to selectively control the relative amount of air exiting each outlet.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 1 is a schematic side view of a passive jet spoiler formed according to the invention in an aircraft wing, streamlines indicating the airflow across the outer surfaces of the wing.

FIG. 2 is a schematic side view of a second embodiment of the spoiler of FIG. 1.

FIG. 3 is a schematic side view of a third embodiment of the spoiler of FIG. 1.

FIG. 4 is a schematic side view of a fourth embodiment of the spoiler of FIG. 1.

FIG. 5 is a schematic side view of a fifth embodiment of the spoiler of FIG. 1.

FIG. 6 is a schematic side view of valves used to control the flow of air through the inlet and through the internal passage of the spoiler of FIG. 2.

FIG. 7 is a schematic side view of a valve used to control the flow of air through the outlet of the spoiler of FIG. 2.

FIG. 8 is schematic side view of an alternate embodiment of the valve of FIG. 7.

FIG. 9 is an enlarged plan view of a portion of the valve of FIG. 8, the valve being shown partially open.

DETAILED DESCRIPTION OF THE INVENTION

Figure 12:
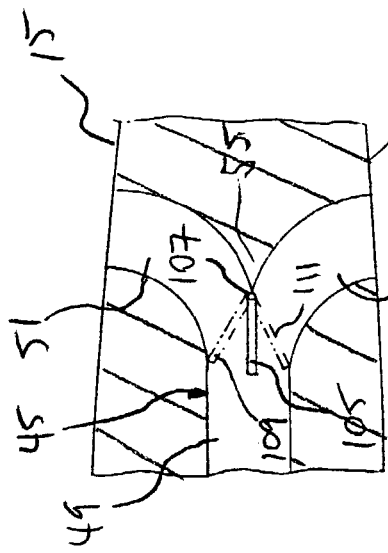
FIG. 12 is a schematic side view of valves used to control the flow of air through the outlets of the spoiler of FIG. 4.

FIGS. 1 through 11 illustrate embodiments of virtual spoiler of the invention formed in a wing 11 of an airplane and used to induce yaw moments for flight control of an aircraft. Though shown as having a typical cross-section and planform, wing 11 may be of any shape that provides sufficient interior volume for housing a virtual spoiler. Also, though the spoilers are shown in two-dimensional cross-sections, it should be understood that the spoilers have a lateral width along wing 11.

Referring to FIG. 1, internal, passive, jet spoiler 13 is formed within the internal volume of wing 11 at a selected distance from the axis of yaw rotation of the aircraft. Wing 11 has an upper surface 15 and a lower surface 17, surfaces 15, 17 being joined at leading edge 19 and trailing edge 21. Spoiler 13 comprises an inlet 23, a passage 25, and an outlet 27. In the embodiment of FIG. 1, the cross-sectional areas of inlet 23, passage 25, and outlet 27 are preferably equal and may have a continuous perimeter, e.g., circular or oval, or the perimeter may be polygonal. Because the cross-sectional area remains the same throughout spoiler 13, air flowing through spoiler 13 is not accelerated. Although the section lines indicate that wing 11 is solid, it would likely be hollow. Passage 25 could be a tubular member within wing 11 or flow could communicate from inlet 23 to outlet 27 through a hollow space in wing 11. Inlet 23 and outlet 27 are spaced apart from each other, with inlet 23 being located on a forward portion of wing 11 and outlet 27 being located aft, or downstream, of inlet 23. Inlet 23 is preferably located in the forward portion of a chord of wing 11, forward of the mid point of the chord. Outlet 27 is located aft of the midpoint of the chord in the preferred embodiment. Inlet 23 and outlet 27 intersect lower surface 17 for diverting a portion of the airflow adjacent lower surface 17 into inlet 23, through passage 25, and out of outlet 27 to rejoin the air flowing over lower surface 17.

As described above, wing 11 produces lift when air flowing over upper surface 15 flows at a higher velocity than air flowing over lower surface 17. To minimize drag on wing 11, it is required that airflow over surfaces 15, 17 remains attached to surfaces 15, 17. By introducing the air to the flow at outlet 27, a portion of the airflow becomes separated from lower surface 17 and forms separated flow area 28 adjacent lower surface 17 and downstream of outlet 27. Separated flow area 28 causes additional drag on wing 11.

The additional drag on wing 11 is an additional rearward force on wing 11 for a given airspeed. This force acts on a moment arm equal to the distance from outlet 27 to the yaw axis of the aircraft, causing the nose of the aircraft to yaw in the direction of the drag. Only a small portion of the airflow is required to be diverted into spoiler 13 to cause the flow separation and additional drag, and the change in the lift produced by wing 11 due to the change in flow is minimized. However, lift is somewhat reduced, inducing a small roll moment on the aircraft. In addition, the change in flow may induce a small pitch moment on the aircraft. These undesirable moments point to the need for zeroing, or balancing, the rolling or pitching moments while inducing yawing moments.

A second embodiment of the invention is shown in FIG. 2. Spoiler 29 is formed in wing 11 and comprises inlet 31, passage 33, and outlet 35. Inlet 31 and passage 35 are formed like those in FIG.1, with inlet 31 intersecting lower surface 17. However, outlet 35 intersects upper surface 15 at a location aft of inlet 31, providing a pathway for communicating air from below lower surface 17 to above upper surface 15. As shown, inlet 31, passage 33, and outlet 35 have equal cross-sectional areas.

As described for the previous embodiment, a portion of the air flowing over lower surface 17 is diverted into inlet 31, and then the air flows through passage 33 and out of outlet 35. The air exits adjacent upper surface 15, causing the attached airflow over outlet 35 to become separated in flow area 36, causing the desired drag and resulting yaw moment. As with spoiler 13 (FIG. 1), small pitch and/or roll moments may be induced by the change in the amount of lift produced by wing 11.

A third embodiment, shown in FIG. 3, has a spoiler 37 in wing 11, spoiler 37 having an inlet 39 on lower surface 17, an internal passage 41, and a outlet 43 in upper surface 15 aft of inlet 39. Outlet 43 has a smaller cross-sectional area than inlet 39 and passage 41, and this decrease in cross-sectional area causes the air passing through outlet 43 to accelerate to a higher velocity than when it entered inlet 39. By accelerating the airflow at or near outlet 43, flow losses within spoiler 37 are reduced. The air exits outlet 43 adjacent upper surface 15 at high velocity, increasing the effectiveness in causing formation of a separated flow area 44 downstream of outlet 43. Separated flow area 44 causes drag on wing 11, and, as with spoiler 29, small pitch and roll moments may also be produced.

Though relatively small, the pitch and roll moments produced by spoilers 13 (FIG. 1), 29 (FIG. 2), and 37 (FIG. 3) may be undesirable if only a yaw moment is required. To effectively counteract the roll and pitch moments, an additional outlet can be provided on the opposite side of wing 11 as the first outlet. This configuration is shown and described in the following embodiments.

FIG. 4 shows spoiler 45 formed in wing 11. Spoiler 45 has a single inlet 47, which communicates with internal passage 49. For releasing the air passing through spoiler 45, an upper outlet 51 on upper surface 15 and a lower outlet 53 on lower surface 17 communicate with passage 49. A guide 55 is located at the rear of passage 49 for dividing the air flowing through passage 49 and turning the flows into each respective outlet 51, 53. While outlets 51, 53 are shown as being located at approximately the same longitudinal distance from leading edge 19, outlet 51 may be located forward or aft of outlet 53.

As air passes across lower surface 17, a portion of the air flows into inlet 47 and into passage 49. At the rear of passage 49, the portion of air divides at guide 55 and flows into and out of outlets 51, 53, causing formation of separated flow area 57, which forms downstream of outlet 51, and separated flow area 59, which forms downstream of outlet 53. Areas 57, 59 cause additional drag on wing 11, creating a yaw moment on wing 11. However, the presence of outlets on both upper surface 15 and lower surface 17 may allow control or elimination of some or substantially all of any roll and pitch moments created by use of spoiler 45.

An additional embodiment of the invention is shown in FIG. 5 as spoiler 61. Like spoiler 45 of FIG. 4, spoiler 61 has a single inlet 63 connected to an internal passage 65 for communicating air from inlet 63 to an upper outlet 67, located on upper surface 15, and a lower outlet 69, located on lower surface 17. Upper outlet 67 is located further rearward than lower outlet 69, and a second passage 71 extends from the rear portion of passage 65 to upper outlet 67. A guide 73 is located at the rear of passage 65 for dividing and directing air into passage 71 to travel to outlet 67 and turning air into lower outlet 69. As air exits upper outlet 67, the airflow over upper surface 15 separates, creating separated flow area 75. Likewise, separated flow area 77 is produced when air exits lower outlet 69.

Moving the upper outlet rearward from the position shown in previous embodiments is advantageous, producing a sufficient yaw moment while reducing the associated roll moment. This effect is due to the fact that pressure gradients on the upper surface of typical wings are adverse going downstream and proverse going upstream. In addition, the pressure distribution created by a jet spoiler is a positive increment just upstream and a negative increment downstream. The upstream positive increment propagates upstream very well because of the proverse pressure gradient in that direction, causing larger losses in lift and, therefore, larger undesirable rolling moments that are not balanced by an opening in the lower surface. Moving the upper outlet aft and/or diverting more air to the lower surface and less to the upper surface assists in creating a yawing moment with a near-zero rolling moment.

To allow for use in flight control of an aircraft, the invention provides for selective and controlled effect of the spoilers through valves that limit the amount of airflow through the spoilers. FIGS. 6 and 7 show optional controllers for limiting the amount of airflow through spoiler 29. In FIG. 6, the opening of inlet 31 has a permeable or porous cover 79, which is preferably formed from a rigid material and is mounted flush with lower surface 17. Cover 79 prevents particles or other contaminants from entering inlet 31 and may eliminate any increase in radar cross-section when inlet 31 is open. To limit the amount of air entering inlet 31, a valve 81 is movably connected to inlet 31. Valve 81 is shown as a flap connected to the interior of inlet 31 at hinge 83, though valve 81 may be of other types, such as a sliding valve (see FIG. 7) or an iris-type valve. When valve 81 is in the closed position, as shown, air is prevented from entering inlet 31. Valve 81 is preferably adjacent the interior surface of cover 79 when in the closed position. By rotating the flap about hinge 83 to an open position, shown in phantom, air is allowed to pass through cover 79 and enter inlet 31.

To control airflow through internal passage 33, a valve, such as butterfly valve 85, is positioned within passage 33. Butterfly valve 85 has a perimeter shape that is approximately the same shape and size as the cross-sectional area of passage 33, and valve 85 rotates on shaft 87 between a closed position, as shown, to an open position, which is shown in phantom. In the closed position, butterfly valve 85 prevents all or substantially all airflow through passage 33. In the open position, valve 85 is rotated so that the plane of the perimeter is approximately perpendicular to the cross-sectional area of passage 33, allowing air to flow past valve 85. Butterfly valve 85 is shown in a forward portion of passage 33, but valve 85 may be located at a position within passage 33.

FIG. 7 shows the rear portion of passage 33 and outlet 35 of spoiler 29. Like cover 79 of inlet 31, outlet 35 has a cover 89 that is flush with upper surface 15 and allows air to flow out of outlet 35. A valve 91 is movably connected near cover 89, preferably adjacent the interior surface of cover 89. Valve 91 is shown as a sliding plate in the closed position, with valve 91 in the open position being shown in phantom. In the open position, valve 91 allows air to pass out of outlet 35 through cover 89. In the closed position, valve 91 prevents air from flowing out of outlet 35. Though shown as a sliding type, valve 91 may also be a hinged valve, like valve 81 of FIG. 6, or other type of valve.

An alternate embodiment of a sliding-type valve 91 is shown in FIGS. 8 and 9. Cover 89 has a plurality of generally vertical openings or holes 92 that extend through the thickness of cover 89. Valve 91 also has a plurality of openings or holes 93, which are parallel to holes 92 and offset from holes 92 when valve 91 is in the closed position, as shown in FIG. 8. As valve 91 slides a selected distance in a generally horizontal direction relative to cover 89, holes 93 move into partial or full alignment with holes 92, allowing air to pass from outlet 35 through cover 89. Full alignment of holes 92, 93 allows the maximum amount of air to flow through cover 89. FIG. 9 is a plan view showing a portion of valve 91 located under a portion of cover 89, holes 92, 93 being partially offset for permitting a reduced amount of air to flow through cover 89. While holes 92, 93 are shown as being circular, holes 92, 93 may also be formed as other shapes. In addition, holes 92, 93 may be of varying sizes, allowing different portions of the adjacent inlet or outlet to be opened.

Figure 10:
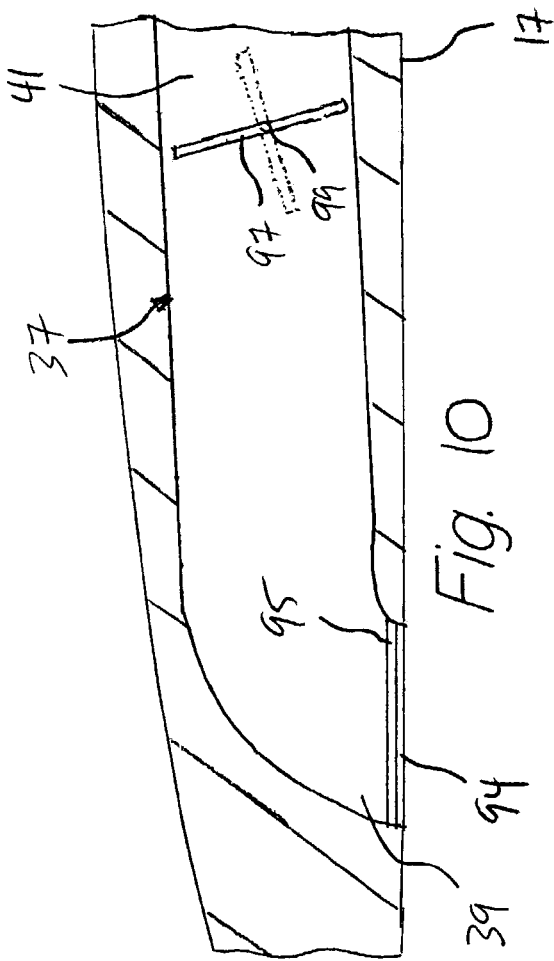
FIG. 10 is a schematic side view of a valve used to control the flow of air through the inlet of the spoiler of FIG. 3.
Figure 11:
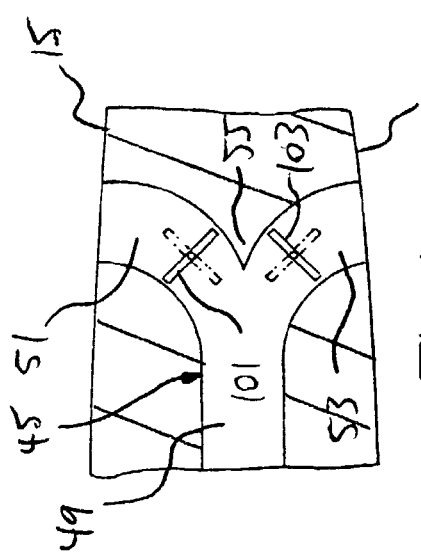
FIG. 11 is a schematic side view of a valve used to control the flow of air through the outlet of the spoiler of FIG. 4.

FIGS. 10 through 12 further illustrate the use of valves in spoilers of the invention. In FIG. 10, the forward portion of spoiler 37 is shown. Inlet 39 has a cover 94 like covers 79, 89, cover 94 being mounted flush with lower surface 17. A valve 95 is connected to inlet 39, and valve 95 may be of various types, such as a hinged flap, like valve 81 of FIG. 6, or a sliding plate, like valve 91 of FIG. 7, for controlling the flow of air through cover 94. Butterfly 97 rotates on shaft 99 in the forward portion of passage 41 for controlling the airflow through passage 41.

FIG. 11 shows locating butterfly valves 101, 103 in outlets 51, 53, respectively. Valves 101, 103 are operated independently to control the amount of airflow through each outlet 51, 53, and are preferably controlled to limit pitch and roll moments while producing the desired yaw moment. Alternatively, the relative amounts of airflow directed into outlets 51, 53 can be selectively controlled with valve 105, shown in FIG. 12, which is pivotally connected to the forward edge of guide 55 at hinge 107. Valve 105 can be rotated to any position between an upper position 109, in which outlet 51 is closed off from passage 49 and all air is directed to outlet 53, and a lower position 111, in which outlet 53 is closed off from passage 49 and all air is directed through outlet 51.

Figure 13:
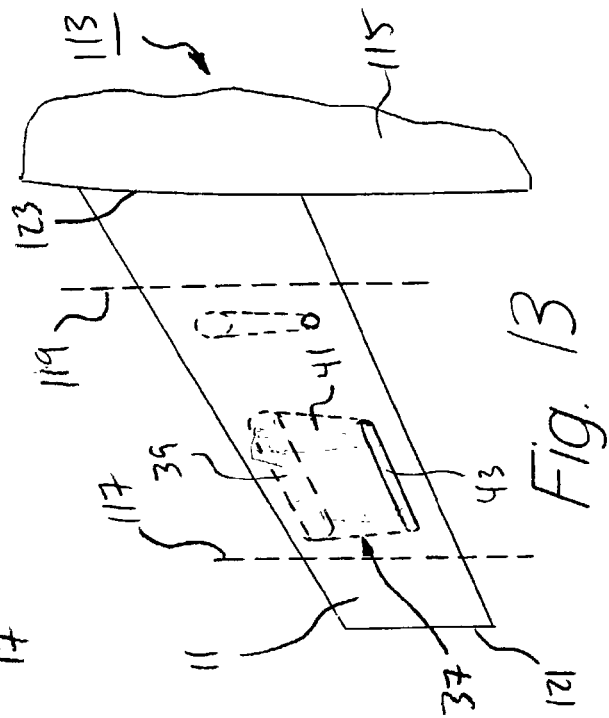
FIG. 13 is a schematic plan view of an aircraft wing attached to the fuselage of an aircraft, showing placement of spoilers in the wing.

FIG. 13 is a plan view of aircraft 113, comprising wing 11 and fuselage 115. A plurality of spoilers 37 are located at selected lateral positions on wing 11 to provide for varying yaw moments. This is due to both the aerodynamic effect produced by each spoiler 37 at different areas of wing 11, as well as the different lengths of the moment arms upon which the drag force acts to create a yaw moment. Spoilers 37 are preferably located near a central portion of wing 11, here indicated to be between lines 117 and 119. The central positioning places spoilers 37 in the main lifting area of wing 11, avoiding aerodynamic effects encountered near wingtip 121 or root 123. Though shown with two spoilers 37, with one of spoilers 37 being wider than the other, any number of any of the embodiments of the jet spoilers of the invention may be used, and their positioning on wing 11 and lateral width may vary from that shown. Also, spoilers could be located on other airfoils of the aircraft, such as horizontal stabilizers.

There are several advantages realized from using the present invention. Use of a passive jet spoiler for yaw control eliminates the need for a physical spoiler that may increase radar cross-section. A passive jet spoiler eliminates the need for a source of pressurized air to be provided and carried aboard the aircraft. Also, by providing optimal placement and outlets on the upper and lower surfaces of wings, the desired yaw moment is achieved with minimal decrease in lift and minimal pitch and roll moments.

While the invention has been shown in only one of its forms, it should be apparent to those skilled in the art that it is not so limited, but is susceptible to various changes without departing from the scope of the invention.

I claim:

1. An airfoil having an outer surface with an upper side, an opposing lower side, a leading edge, and a trailing edge, the airfoil comprising:
    an inlet located on the outer surface of the airfoil;
    an upper outlet located on the upper side of the airfoil and a lower outlet located on the lower side of the airfoil, each outlet positioned in fluid communication with the inlet and positioned forward of the trailing edge of the airfoil; wherein
    the upper and lower outlets are positioned so that when a portion of air flowing adjacent the outer surface is diverted into the inlet and out the outlets, the portion of air causes an attached air flow to become separated from the outer surface downstream of each of the outlets through which the portion of air flows, substantially forward of the trailing edge of the airfoil; and
    at least one valve between the inlet and the outlets for controlling air flow from the inlet to the outlets.

2. The airfoil of claim 1, wherein:
    the inlet is located forward of a midpoint along a chord of the airfoil and the outlets are located aft of the midpoint of the chord of the airfoil.

3. The airfoil of claim 1, wherein:
    the inlet is located on the lower side of the airfoil.

4. The airfoil of claim 1, wherein:
    said at least one valve has a first position wherein the air flow through the inlet passes only through one of the outlets and a second position wherein the air flow through the inlet passes through only the other of the outlets.

5. The airfoil of claim 4, wherein:
    said at least one valve has a third position that causes more air flow through one of the outlets than the other of the outlets.

6. The airfoil of claim 1, wherein:
    the at least one valve is a sliding gate type valve selectively movable between an open position, which allows air to freely flow past the valve, a closed position, which blocks the flow of air past the valve, and a partially open position, which allows a reduced amount of flow of air past the valve.

7. The airfoil of claim 1, wherein:
    the at least one valve comprises a plate that slidingly engages an adjacent cover, each of the plate and the cover having openings therethrough, the openings of the plate and the cover being aligned when the at least one valve is in the open position, the openings being misaligned when the at least one valve is in the closed position.

8. An airfoil having an outer surface with an upper side and a lower side, comprising:
    an inlet located on the outer surface of the airfoil;
    an upper outlet located on the upper side of the airfoil and a lower outlet located on the lower side of the airfoil, one of the outlets spaced longitudinally downstream of the other of the outlets and each outlet being in fluid communication with the inlet and positioned so that a portion of air flowing adjacent the outer surface is diverted into the inlet and out the outlets to thereby cause an attached air flow to become separated downstream of each of the outlets through which the portion of air flows; and
    at least one valve between the inlet and the outlets for controlling air flow from the inlet to the outlets.

9. An airfoil having an outer surface with an upper side and a lower side, comprising:
    an inlet located on the outer surface of the airfoil;
    an upper outlet located on the upper side of the airfoil and a lower outlet located on the lower side of the airfoil, a main passage leading from the inlet toward the outlets and each outlet being in fluid communication with the inlet and positioned so that a portion of air flowing adjacent the outer surface is diverted into the inlet and out the outlets to thereby cause an attached air flow to become separated downstream of each of the outlets through which the portion of air flows;
    upper and lower passages joining the main passage at a Y-junction and leading to the upper and lower outlets; and
    a valve between the inlet and the outlets for controlling air flow from the inlet to the outlets, the valve located at the Y-junction and selectively movable between a first position, in which substantially all of the portion of air is directed into one of the outlets, and a second position, in which substantially all of the portion of air is directed into the other of the outlets.

10. An aircraft having a yaw control system, the aircraft having upper and lower surfaces forming a wing profile having a leading edge and enclosing an interior volume, the system comprising:
    an inlet located on the lower surface aft of the leading edge, forward of a midpoint of a chord of the wing, and being in fluid communication with an internal passage located within the interior volume;
    an upper outlet located on the upper surface and longitudinally spaced downstream of the inlet aft of the midpoint of the chord, the upper outlet being in fluid communication with the internal passage;
    a lower outlet located on the lower surface and longitudinally spaced downstream of the inlet aft of the midpoint of the chord, the lower outlet being in fluid communication with the internal passage; and wherein
    the upper and the lower outlets are positioned so that a portion of air flowing adjacent the lower surface is diverted into the inlet, through the internal passage, and selectively out of both the upper and lower outlets to cause an attached air flow to become separated from the upper surface downstream of the upper outlet and from the lower surface downstream of the lower outlet to thereby control aircraft yaw.

11. The system of claim 10, further comprising:
    at least one valve for controlling the amount of air passing through the internal passage, the valve being located in one of the inlet, internal passage, and upper and lower outlets.

12. The system of claim 11, wherein:
    the at least one valve is a rotatable butterfly type valve selectively movable between an open position, which allows air to freely flow past the valve, and a closed position, which restricts the flow of air past the valve.

13. The system of claim 11, wherein:
    the at least one valve is a sliding gate type valve selectively movable between an open position, which allows air to freely flow past the valve, and a closed position, which restricts the flow of air past the valve.

14. The system of claim 13, wherein:
    the sliding gate type valve comprises a plate that slidingly engages an adjacent cover, each of the plate and the cover having openings therethrough, the openings of the plate and the cover being aligned when the valve is in the open position, the openings being misaligned when the valve is in the closed position.

15. The system of claim 10, further comprising:

a valve selectively movable between a first position, in which substantially all of the portion of air is directed into the upper outlet, and a second position, in which substantially all of the portion of air is directed into the lower outlet, the valve also being selectively positionable between the first and second positions for diverting a selected amount of the portion of air into each of the outlets.

16. A method for controlling yaw of an aircraft having an airfoil with an outer surface having upper and lower sides, the method comprising:

(a) forming an air inlet on the outer surface, first and second outlets on opposite and opposing sides of the outer surface, the outlets being spaced downstream from the inlet, the inlet and the outlets being connected to each other within the airfoil;

(b) propelling the aircraft through air for causing air to flow across the outer surfaces of the airfoil; and (c) diverting a first portion of the air flowing across the outer surface into the inlet and out the first outlet, the first portion of air causing an attached airflow to become detached from the outer surface downstream of the first outlet thereby increasing drag for controlling yaw; and (d) diverting a second portion of the air flowing across the outer surface into the inlet and out the second outlet when diverting the first portion of the air to reduce any pitch and roll moments caused by the first portion of air flowing out the first outlet.

17. The method of claim 16, wherein:

step (a) further comprises forming the inlet on a lower surface of the airfoil forward of a midpoint of the chord of the airfoil.

* * * * *